United States Patent
Lin et al.

(10) Patent No.: US 8,404,319 B2
(45) Date of Patent: Mar. 26, 2013

(54) TRANSPARENT SUBSTRATE WITH LOW BIREFRINGENCE

(75) Inventors: Chen-Lung Lin, Taichung County (TW); Chyi-Ming Leu, Taichung County (TW); Hang-Chang Chang, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 1344 days.

(21) Appl. No.: 11/940,509

(22) Filed: Nov. 15, 2007

(65) Prior Publication Data

US 2008/0286498 A1    Nov. 20, 2008

(30) Foreign Application Priority Data

May 14, 2007   (TW) ................................ 96117000 A

(51) Int. Cl.
G02F 1/133     (2006.01)
C08G 75/23     (2006.01)
C08G 73/10     (2006.01)
C08G 69/26     (2006.01)

(52) U.S. Cl. ...... 428/1.6; 428/473.5; 349/158; 528/171; 528/172; 528/353

(58) Field of Classification Search .............. 428/1.6, 428/473.5; 349/158; 528/171–172, 353, 528/391, 423
See application file for complete search history.

(56) References Cited

U.S. PATENT DOCUMENTS

| | | | | |
|---|---|---|---|---|
| 4,963,649 A | * | 10/1990 | Wright et al. | 528/353 |
| 4,986,880 A | * | 1/1991 | Dorfman | 216/83 |
| 5,580,918 A | * | 12/1996 | Morita et al. | 524/413 |
| 5,723,571 A | * | 3/1998 | Oka et al. | 528/353 |
| 6,389,215 B1 | | 5/2002 | Lindsay et al. | |
| 6,885,032 B2 | * | 4/2005 | Forbes et al. | 257/72 |
| 7,795,370 B2 | * | 9/2010 | Kusaka et al. | 528/289 |

FOREIGN PATENT DOCUMENTS

| | | |
|---|---|---|
| JP | 2005163012 | 6/2005 |
| TW | 200712618 | 4/2007 |

OTHER PUBLICATIONS

JPO Website Machine English Translation of JP 07-304870, Matsumoto et al., Nov. 21, 1995.*
English language translation of abstract of TW 200712618 (p. 3 of publication, published Apr. 1, 2007).

* cited by examiner

*Primary Examiner* — Sophie Hon
(74) *Attorney, Agent, or Firm* — McClure, Qualey & Rodack, LLP

(57) ABSTRACT

The invention relates to a transparent substrate with low birefringence. The transparent substrate comprises polyimide having a repeat unit of formula (I) and has a birefringence below 0.005:

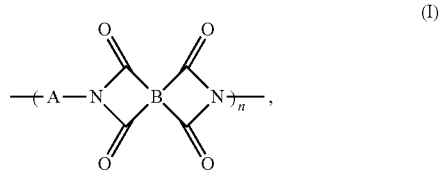

wherein each A of the repeat unit, being the same or different, represents an aromatic or aliphatic group, and at least one A is an aromatic or aliphatic group containing sulfonyl functionality; each B of the repeated unit, being the same or different, represents an aromatic or cycloaliphatic group; and n is an integer greater than one.

6 Claims, No Drawings

TRANSPARENT SUBSTRATE WITH LOW BIREFRINGENCE

BACKGROUND OF THE INVENTION

1. Field of the Invention

The present invention relates to a transparent substrate with low birefringence, and in particular, relates to a transparent polyimide substrate polyimide having a birefringence below 0.005 for use as a flat panel display substrate.

2. Description of the Related Art

In recent years, development of flat panel displays have trended toward larger and larger sizes, with glass, mainly used as the substrate for fabrication of flat panel displays. Accordingly, as development of flat panel displays trend toward larger and larger sizes, the weight of required glass makes the flat panel display heavier and costly due to increased raw material glass prices. Therefore, in order to meet requirements of lightness and thinness for flat panel displays, plastics is increasingly being substituted for glass, due to the easier processing of plastics and lighter weight.

Plastic substrates have high flexible and winding property, and may be used as the top and bottom substrates of a flexible flat panel display. Flexible flat panel displays utilizing plastic versus glass substrate have advantages such as a lighter weight, thinnest, having better impact resistant, being harder to break, being easier to carry, an ability to display on curved surfaces, an ability to wind and be dressed, and being able to be fabricated roll-to-roll, thus, reducing costs substantially. Therefore, new generation flexible flat panel displays have trended toward utilizing plastic substrates.

At present, the plastic substrate material most commonly used commercially contains polyimide, which has high heat-resistance, high chemical-resistance and high mechanical strength. However, the birefringence of polyimide typically used is too high, usually greater than 0.005. A high birefringence substrate reduces black and white contrast and increases color shift at wide viewing angles.

Therefore, developing a low birefringence polyimide material to be used as a transparent substrate for a flat panel display is desired.

BRIEF SUMMARY OF THE INVENTION

The present invention provides a transparent substrate with low birefringence below 0.005, comprising polyimide having a repeat unit of formula (I):

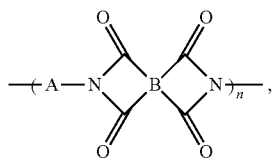

wherein each A of the repeat unit, being the same or different, represents an aromatic or aliphatic group, and at least one A is an aromatic or aliphatic group containing sulfonyl functionality; each B of the repeated unit, being the same or different, represents an aromatic or cycloaliphatic group; and n is an integer greater than one.

Furthermore, the transparent substrate may be used as the top and bottom substrates of a flexible flat panel display.

A detailed description is given in the following embodiments.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Polyimide is characterized as having high heat-resistance, flexibility and high mechanical strength. The polyimide used herein is synthesized by reacting a diamine monomer comprising sulfonyl with a dianhydride monomer to provide a transparent substrate with low birefringence. The transparent substrate thus formed may be used as the top and bottom substrates of a flexible flat panel display.

The polyimide of the invention may be synthesized by reacting one or more diamine monomer comprising sulfonyl with one or more dianhydride monomer, wherein at least one diamine monomer has an aromatic or aliphatic group containing sulfonyl functionality. The diamine monomer used in the present invention may comprise bis[4-(3-aminophenoxy)phenyl]sulfonyl (3,3-BAPS), 4,4'-diaminodiphenyl sulfonyl (4,4-DDS), 3,3'-diaminodiphenyl sulfonyl (3,3-DDS), 2,2'-bis[4-(4-aminophenoxy)phenyl] propane (BAPP-m) or combinations thereof. The dianhydride monomer used in the present invention may comprise 3,3',4,4'-diphenylsulfonyl tetracarboxylic dianhydride (DSDA), bicyclo[2,2,2]oct-7-ene-2,3,5,6-tetracarboxylic dianhydride (B1317) or combinations thereof.

The polyimide is synthesized by a typical polycondensation which may be carried out in two different routes. In the first route, the synthesis is carried out in two stages. First, a diamine monomer is reacted with a dianhydride monomer in a polar solvent to form a precursor of polyimide, poly(amic acid) (PAA). Then the thermal imidization (300-400° C.) or chemical imidization of the precursors is performed to form polyimide. The reaction scheme of the first route is shown in formula (T1), wherein the diamine monomer is 3,3-BAPS, the dianhydride monomer is DSDA and the polar solvent is N-methyl-2-pyrrolidone (NMP):

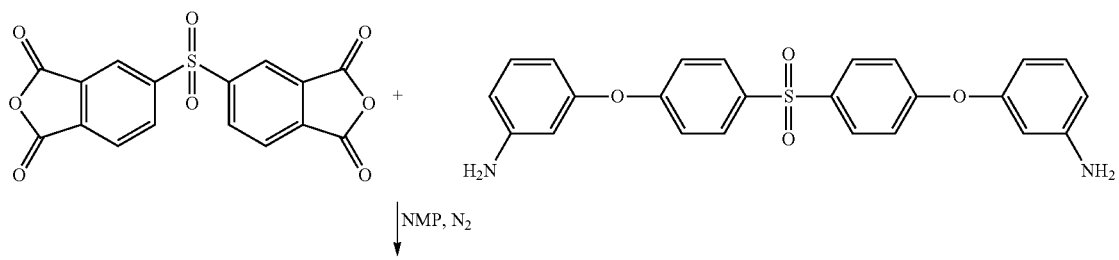

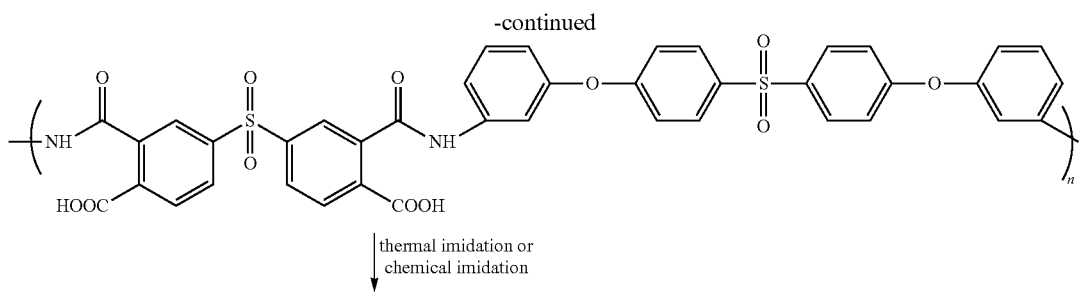

↓ thermal imidation or chemical imidation

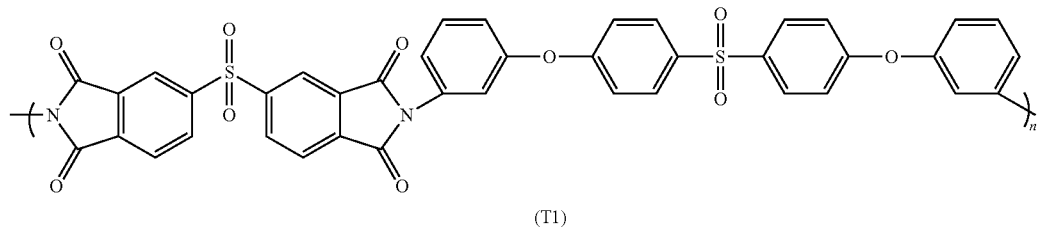

(T1)

In the second route, a diamine monomer is reacted with a dianhydride monomer in a phenol solvent, such as m-cresol or Cl-phenol, and then the temperature is raised to reflow temperature to form a poly(amic acid) and simultaneously, imidization of the poly(amic acid) is performed, thus obtaining the polyimide. The reaction scheme of the second route is shown in formula (T2), wherein the diamine monomer is 3,3-BAPS and the dianhydride monomer is DSDA:

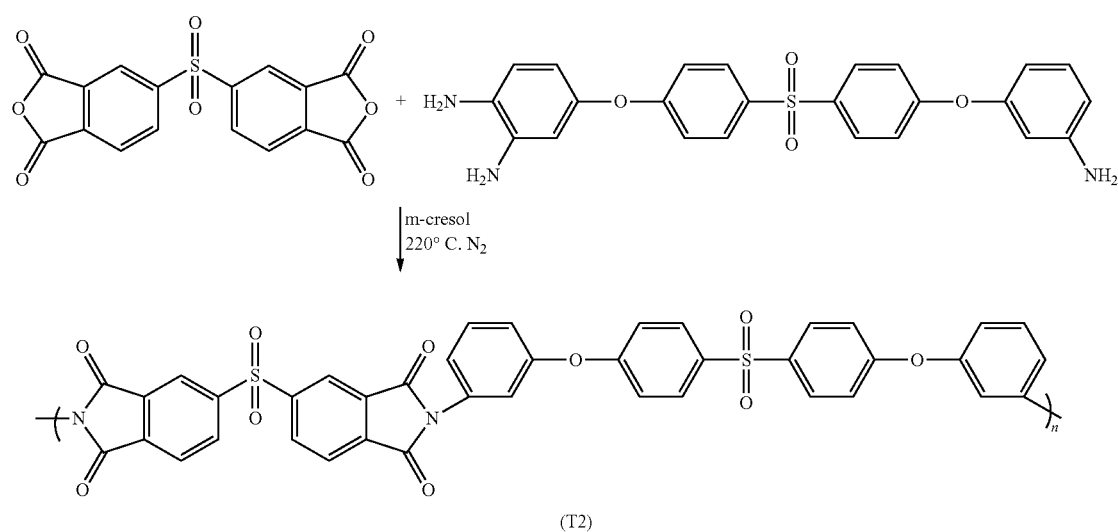

(T2)

In polyimide of formula (I) of the invention, A is an aromatic or aliphatic group containing sulfonyl functionality comprising:

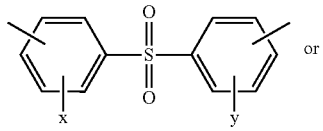 or

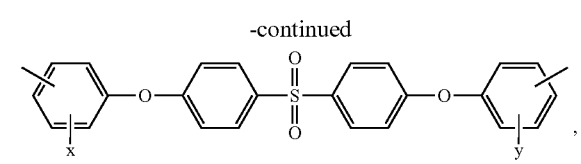

wherein x and y are independently selected from the group consisting of: H, $CH_3$, $CF_3$, OH, Br, Cl, I, $C_{1-18}$ alkyl and $C_{1-18}$ alkoxy.

Furthermore, B of formula (I) may comprise

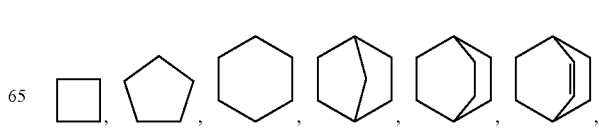

-continued

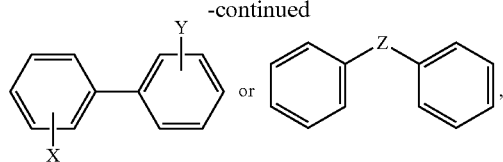

wherein x and y are independently selected from the group consisting of: H, $CH_3$, $CF_3$, OH, Br, Cl, I, $C_{1-18}$ alkyl and $C_{1-18}$ alkoxy, Z is O, S, $CH_2$, $C(CH_3)_2$, $C(CF_3)_2$, $SO_2$, Ar—O—Ar, Ar—$CH_2$—Ar, Ar—$C(CH_3)_2$—Ar, Ar—$C(CF_3)_2$—Ar or Ar—$SO_2$—Ar, and Ar is benzene.

In formula (I), n may be an integer between 10 and 10000.

In one embodiment, the polyimide of the invention may comprise formula (PI1) or formula (PI2).

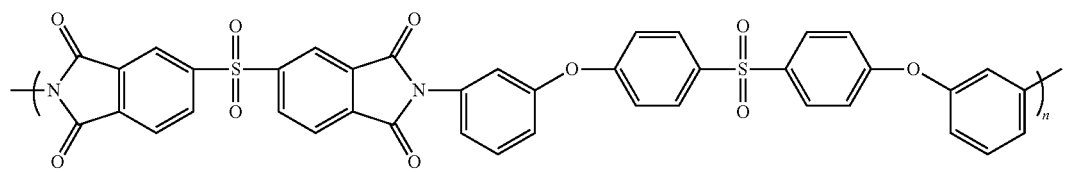

PI1

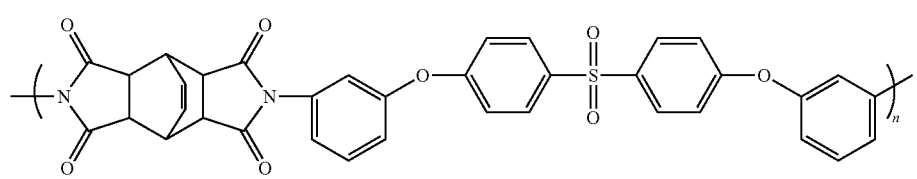

PI2

Moreover, more than one type of diamine monomer and dianhydride monomer may be used in the reaction for the polyimide. With two types of diamine monomer and two types of dianhydride monomer used, the polyimide thus formed may be represented by formula (II) and as mentioned above, at least one of the diamine monomer is an aromatic or aliphatic group containing sulfonyl functionality.

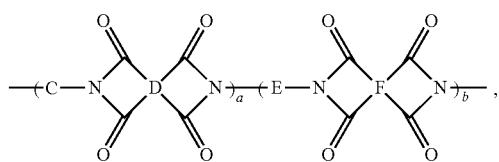

(II)

wherein C is an aromatic or aliphatic group containing sulfonyl functionality; E is an aromatic or aliphatic group without sulfonyl functionality; D and F are aromatic or cycloaliphatics; and a and b are integers great than 1, preferably between 10 and 10000.

In formula (II), a molar ratio of C to E may be between 9:1 and 1:9 and a molar ratio of C to E may be between 9:1 and 1:9.

In one embodiment, C of formula (II) may comprise

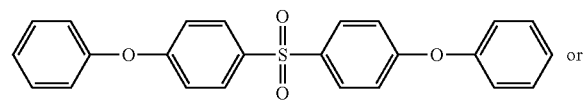 or

-continued

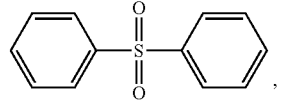

E of formula (II) may be

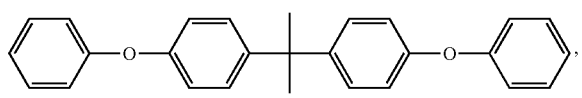

-continued

and D and F may be the same, such as

A transparent substrate with a birefringence lower than 0.005, preferably 0.001, or more preferably 0.0001 can be achieved by a polyimide synthesized from a diamine monomer comprising aromatic or aliphatic group having sulfonyl functionality and a dianhydride monomer. Moreover, the transparent substrate may be used as top and bottom substrates of a flexible flat panel display. Because the birefringence of the transparent substrate of the invention is at least lower than 0.005, the problems associated with typical polyimide substrates, such as low contrast, color shift and light leakage may be improved.

The flexible flat panel display mentioned above may comprise a liquid crystal display or an organic electroluminescence display. If the flexible flat panel display is a liquid crystal display, a liquid crystal layer is placed between the top and bottom substrates. If the flexible flat panel display is an organic electroluminescence display, an organic electroluminescence layer is placed between the top and bottom substrates.

The synthesis procedures and results of relative tests of various examples of the polyimide in accordance with formulas (I) or (II) of the invention will be detailed in the following.

EXAMPLE

Example 1

Polyimide PI1 (DSDA/3,3-BAPS)

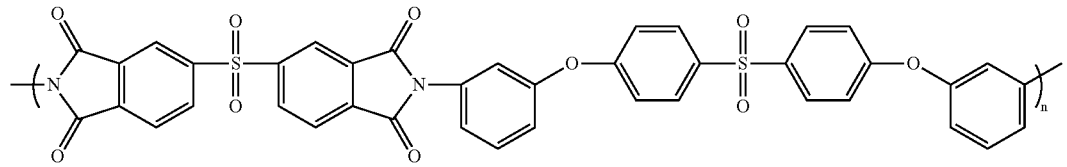

At room temperature, 5.9 g of 3,3-BAPS diamine monomer and 43.6 g of m-cresol were charged in a three-necked bottle under nitrogen atmosphere. After 3,3-BAPS was completely dissolved in m-cresol, 5 g of DSDA dianhydride monomer was added. After DSDA was completely dissolved, the reaction mixture was stirred for 1 hour to form a sticky polyimide solution. Thereafter, the polyimide solution was heated for reaction at 220° C. for 3 hours, during which time the water produced by the reaction was removed. Then, the reaction solution was dripped into methanol to participate the polyimide and dried in a vacuum oven for 12 hours, thus obtaining DSDA/3,3-BAPS polyimide.

Example 2

Polyimide PI2 (B1317/3,3-BAPS)

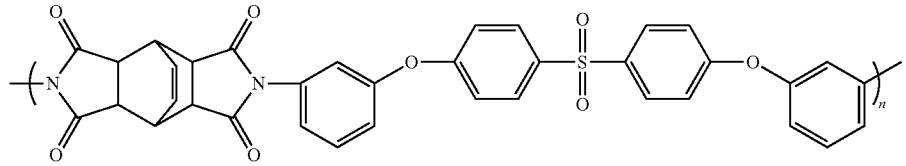

At room temperature, 17.1 g of 3,3-BAPS diamine monomer and 81 g of m-cresol were charged in a three-necked bottle under nitrogen atmosphere. After 3,3-BAPS was completely dissolved in m-cresol, 9.9 g of B1317 dianhydride monomer was added. After B1317 was completely dissolved, the reaction mixture was stirred for 1 hour to form a sticky polyimide solution. Thereafter, the polyimide solution was heated for reaction at 220° C. for 3 hours, during which time the water produced by the reaction was removed. Then, the reaction solution was dripped into methanol to participate the polyimide and dried in a vacuum oven for 12 hours, thus obtaining B1317/3,3-BAPS polyimide.

Example 3

Polyimide PI3 (B1317/3,3-BAPS/BPAA-m)

A molar ratio of 3,3-BAPS to BPAA-m is 8:2.

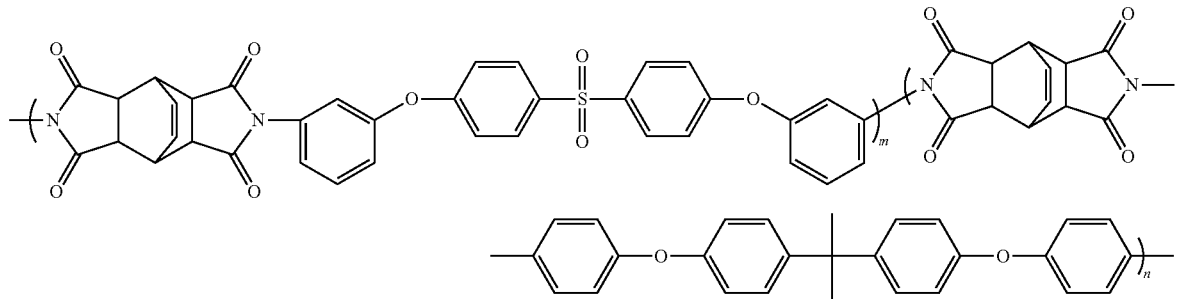

At room temperature, 13.7 g of 3,3-BAPS diamine monomer, 3.2 g of BPPA-m diamine monomer and 107 g of m-cresol were charged in a three-necked bottle under nitrogen atmosphere. After 3,3-BAPS and BPPA-m were completely dissolved in m-cresol, 10 g of B1317 dianhydride monomer was added. After B1317 was completely dissolved, the reaction mixture was stirred for 1 hour to form a sticky polyimide solution. Thereafter, the polyimide solution was heated for reaction at 220° C. for 3 hours, during which time the water produced by the reaction was removed. Then, the reaction solution was dripped into methanol to participate the polyimide and dried in a vacuum oven for 12 hours, thus obtaining B1317/3,3-BAPS/BPAA-m polyimide.

Example 4

Polyimide P14 (B1317/3,3-DDS/BPAA-m)

A molar ratio of 3,3-DDS to BPAA-m is 6:4.

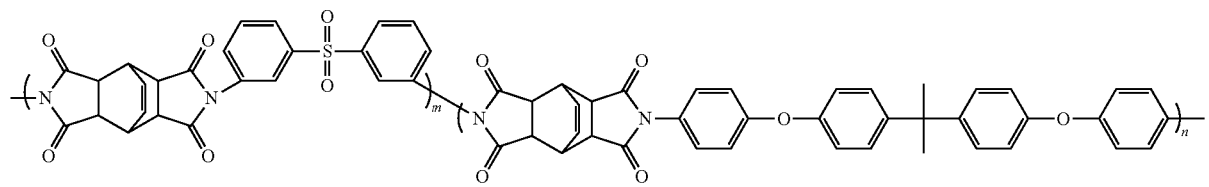

At room temperature, 5.9 g of 3,3-DDS diamine monomer, 6.5 g of BPPA-m diamine monomer and 90 g of m-cresol were charged in a three-necked bottle under nitrogen atmosphere. After 3,3-DDS and BPPA-m were completely dissolved in m-cresol, 10 g of B1317 dianhydride monomer was added. After B1317 was completely dissolved, the reaction mixture was stirred for 1 hour to form a sticky polyimide solution. Thereafter, the polyimide solution was heated for reaction at 220° C. for 3 hours, during which time the water produced by the reaction was removed. Then, the reaction solution was dripped into methanol to participate the polyimide and dried in a vacuum oven for 12 hours, thus obtaining B1317/3,3-DDS/BPAA-m polyimide.

Comparative Example 1

Polyimide CPI1 (DSDA/CHDA)

At room temperature, 3.1 g of cyclohexanediamine (CHDA) diamine monomer and 50 g of m-cresol were charged in a three-necked bottle under nitrogen atmosphere. After CHDA was completely dissolved in m-cresol, 10 g of DSDA dianhydride monomer was added. After DSDA was completely dissolved, the reaction mixture was stirred for 1 hour to form a sticky polyimide solution. Thereafter, the polyimide solution was heated for reaction at 220° C. for 3 hours, during which time the water produced by the reaction was removed. Then, the reaction solution was dripped into methanol to participate the polyimide and dried in a vacuum oven for 12 hours, thus obtaining DSDA/CHDA polyimide.

Comparative Example 2

Polyimide CPI2 (6FDA/TFMB)

At room temperature, 4.7 g of 2,2'-Bis(trifluoromethyl)-4-4'-diamino biphenyl (TFMB) diamine monomer and 60 g of m-cresol were charged in a three-necked bottle under nitrogen atmosphere. After TFMB was completely dissolved in m-cresol, 10 g of 4-4'-(hexafluoroisopropylidene) diphthalic anhydride (6FDA) dianhydride monomer was added. After 6FDA was completely dissolved, the reaction mixture was stirred for 1 hour to form a sticky polyimide solution. Thereafter, the polyimide solution was heated for reaction at 220° C. for 3 hours, during which time the water produced by the reaction was removed. Then, the reaction solution was dripped into methanol to participate the polyimide and dried in a vacuum oven for 12 hours, thus obtaining 6FDA/TFMB polyimide.

Polyimide synthesized by Examples 1-4 and Comparative Examples 1-2 were fabricated into 10×10 $cm^2$ samples by blade coating. Then the birefringence of the samples was measured by Oji Scientific Instrument Kobra 21ADH and the results were shown in Table 1.

TABLE 1

The birefringence of Examples 1-4 and Comparative Examples 1-2

| | Dianhydride monomer | Diamine monomer | Birefringence of polyimide |
|---|---|---|---|
| Example 1 | DSDA | 3,3-BAPS | 0.0001 |
| Example 2 | B1317 | 3,3-BAPS | 0.0002 |
| Example 3 | B1317 | 3,3-BAPS/BAPP-m(8:2) | 0.0006 |
| Example 4 | B1317 | 3,3-DDS/BAPP-m(6:4) | 0.001 |
| Comparative Examples 1 | DSDA | CHDA | 0.005 |
| Comparative Examples 2 | 6FDA | TFMB | 0.046 |

In Table 1, the birefringence of polyimide of Examples 1-4 is significantly lower than that of Comparative Examples 1-2. Specifically the birefringence of polyimide of Examples 1-4 is reduced by 5-500 times as compared to that of Comparative Examples 1-2. This may be attributed to the diamine monomer used in the polyimide of the invention having aromatic or aliphatic group containing sulfonyl functionality. Furthermore, the transparent substrate of the invention may be used as top and bottom substrates of flexible flat panel displays.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flexible flat panel display comprising: a transparent substrate with low birefringence, comprising a polyimide having a birefringence below or equal to 0.0006, wherein, the polyimide has a structure shown below:

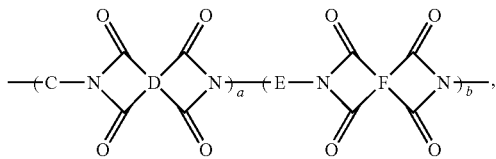

wherein C is

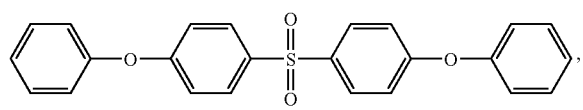

E is

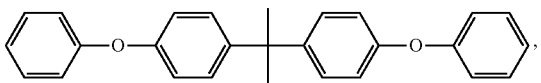

both D and F are

and a and b are integers between 10 and 10000,
wherein in the polyimide, a molar ratio of C to E is 8:2.

2. The flexible flat panel display comprising the transparent substrate as claimed in claim 1, wherein the transparent substrate is used as a first substrate and/or a second substrate of the flexible flat panel display.

3. The flexible flat panel display comprising the transparent substrate as claimed in claim 2, wherein the flexible flat panel display is a liquid crystal display.

4. The flexible flat panel display comprising the transparent substrate as claimed in claim 3, wherein the liquid crystal display further comprises a liquid crystal material layer placed in between the first and second substrates.

5. The flexible flat panel display comprising the transparent substrate as claimed in claim 2, wherein the flexible flat panel display is an organic electroluminescence display.

6. The flexible flat panel display comprising the transparent substrate as claimed in claim 5, wherein the organic electroluminescence display further comprises an organic electroluminescence material layer placed in between the first and second substrates.

* * * * *